United States Patent [19]
Le Van Suu

[11] Patent Number: 5,739,673
[45] Date of Patent: Apr. 14, 1998

[54] CONTROL DEVICE FOR THE CHARGING OF AT LEAST ONE BATTERY

[75] Inventor: Maurice Le Van Suu, Romainville, France

[73] Assignee: SGS-Thomson Microelectronics S.A., Saint Genis, France

[21] Appl. No.: 807,823

[22] Filed: Feb. 27, 1997

[30] Foreign Application Priority Data

Feb. 27, 1996 [FR] France .................... 96 02412

[51] Int. Cl.$^6$ .................... H01M 10/44; H01M 10/46; H02J 7/00
[52] U.S. Cl. .................... 320/31; 320/2; 320/32; 320/39; 320/48; 320/22; 320/35
[58] Field of Search .................... 320/2, 22, 27, 320/30, 31, 48, 49, 32, 39, 35

[56] References Cited

U.S. PATENT DOCUMENTS

| | | | |
|---|---|---|---|
| 5,202,617 | 4/1993 | Nor | 320/2 |
| 5,483,463 | 1/1996 | Qin et al. | 364/492 |
| 5,525,890 | 6/1996 | Iwatsu et al. | 320/14 |

FOREIGN PATENT DOCUMENTS

| | | | |
|---|---|---|---|
| 5-244729 | 1/1992 | Japan | H02J 7/10 |
| WO-A-94 18738 | 8/1994 | WIPO | H02J 7/04 |

OTHER PUBLICATIONS

Yung et al., "A microcontroller-based Battery Charger using Neural-Fuzzy Technology", IEE Third International Symposium on Consumer Electronics, vol. 2, pp. 277–282, Nov. 1994.

French Search Report from French Patent Application 96 02412, filed Feb. 27, 1996.

Wescon '95 Conference Record, Microelectronics, Communications Technology, Producing Quality Products, Mobile and Portable Power, Emerging Technologies, San Francisco, Nov. 7–9, 1995, Institute of Electrical and Electronics Engineers, pp. 614–617, Ullah, Z. et al., "Fast Intelligent Battery Charging: Neural-Fuzzy Approach".

Conference Proceedings of High Frequency Power Conversion 1994, San Jose, CA, USA, Intertec Int. pp. 242–255, D. Mcarty: "Using A Fuzzy Logic Controller For Intelligent Battery Charging".

International Journal of Electronics, vol. 75, No. 1, Jul. 1, 1993, pp. 75–86, Liang Y.C., et al. "Design Of Battery Charging System With Fuzzy Logic Controller".

Patent Abstracts of Japan, vol. 018, No. 635 (E–1638), Dec. 5, 1994 & JP-A-06 245403 (Japan Storage Battery Co., Ltd.).

*Primary Examiner*—Peter S. Wong
*Assistant Examiner*—Patrick B. Law
*Attorney, Agent, or Firm*—Wolf, Greenfield & Sacks, P.C.; James H. Morris

[57] ABSTRACT

A battery-charger uses a fuzzy logic microprocessor. The use of fuzzy logic makes it easier to take account of the diversity of the types of batteries to be charged and to control the state of the batteries charged while, at the same time, producing a battery at very low cost, whereas these functions are normally carried out by far bigger microprocessors. The invention can be applied especially to the charging of batteries assembled to constitute powerful energy sources, that are used especially for automobile haulage, large-scale consumer articles, professional and industrial equipment or computer equipment.

33 Claims, 3 Drawing Sheets

CONTROL DEVICE FOR THE CHARGING OF AT LEAST ONE BATTERY

BACKGROUND OF THE INVENTION

1. Field of the Invention

The present invention relates to a device to control the charging of at least one battery. It also relates to controlling the charging of several assembled electrical batteries, possibly of different types, chiefly used as high-power energy stores. One application of the invention may be the charging of a batch of batteries on board an electrical haulage vehicle. However, the invention is not limited to this application and can be applied to all types of batteries, even small ones, that can be used for example for razors, personal computers, pocket torches, etc.

2. Discussion of the Related Art

There exist known battery-charging devices, especially fast charging devices, that enable the monitoring of the battery charging conditions during the charging operation in order to stop the charging operation before the battery deteriorates. The deterioration that is most usually encountered is deterioration through a sudden rise in temperature. When the battery is at its maximum charge, the phenomenon of electrolysis gets reversed and may cause the irremediable destruction of the battery. It is therefore important to make the charging stop before this stage is reached. The principles implemented in the electronic devices that monitor the charging require a knowledge of characteristic values pertaining to the charged battery. For example, the monitoring of the temperature of a battery will entail choosing a critical temperature. This critical temperature will depend especially on the nature of the walls of the battery; this is because the temperature tested may be measured more directly or less directly. Thus, with known devices, it is necessary to set up a model of each of the types of batteries to be charged and apply command signals for the charging of the battery that depend on a recognized model for the battery.

Certain batteries may show defects such as being short-circuited, or not being able to withstand the charging operation. These devices are not capable of detecting these defects nor preventing their consequences. These are consequences that make the charging operation impossible or ineffective.

SUMMARY OF THE INVENTION

The present invention seeks to overcome these drawbacks by using a control device that operates based on different principles. The control device of the invention relies on the use of fuzzy logic. To this end, one embodiment of the invention obtains a measurement, using voltage divider bridges (although currents could be measured), of different conditions for the charging of the battery. In one embodiment, four different conditions are measured. For all the conditions measured, sets of membership functions are established: each function determines a range of variation of the measurement variable. For this range, it is considered that this variable has a particular qualification. The variable having a qualification is furthermore quantified in the membership function by a membership coefficient. The variable has a concerned qualification with a coefficient ranging from zero to one: the coefficient is zero when the qualification is not met and one when the qualification is met completely.

A set of rules is set up establishing correspondences between these qualifications and signals to be applied to the control circuits.

This embodiment of the invention then entails dealing with the charging conditions (the extent of the charging will vary according to whether the battery to be charged is at a smaller or greater distance from its maximum value) in the same way as with the management of the charging operation (for example, a decision to stop the charging of a battery that does not withstand the charging). Preferably, the device of the invention will therefore carry out the technical control and the administrative control of the charging, both at the same time.

An object of the invention therefore is to control the charging of at least one battery using a control device, this control device comprising a microprocessor, a memory, a set of voltage divider bridges to measure the conditions of the charging of the battery and circuits to control the charging of the battery connected to this device. The memory of the device includes a set of membership functions, attached to signals measured on each of these bridges, forming correspondence values quantified by coefficients between values of the signals and qualifications designating these functions, and stored in the memory, a set of rules setting up correspondence values between the qualifications of membership and command signals to be applied to the control circuits; and a program for the composition of the rules to produce the command signals.

The set of functions and rules forms the behavioral description of the battery as a function of these signals. The command signals correspond to each phase of the progress of the charging as a function of the type of the battery. The microprocessor could be a fuzzy logic microprocessor if the program for composing the rules is implemented by a wired circuit. In this case, this wired circuit performs a barycentration of the results of the application of the rules. The processor may also implement a program of composition that it finds in a memory.

DETAILED DESCRIPTION

Figure 1:
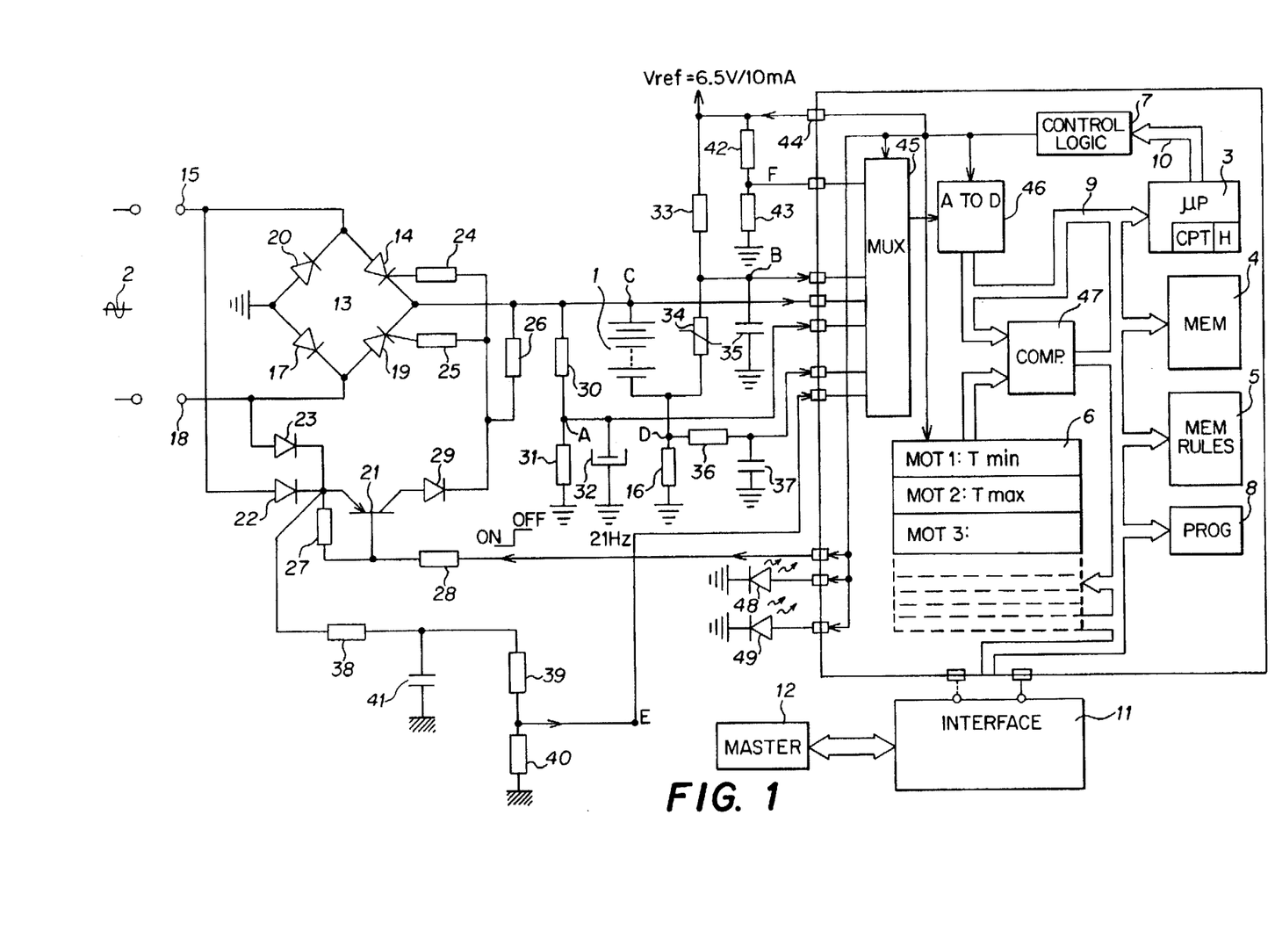
FIG. 1 shows a detailed view of a control device according to one embodiment of the invention.

FIG. 1 shows a device according to one embodiment of the present invention for controlling the charging of at least one battery 1. The battery or batteries 1 are charged through an electrical supply provided by an AC mains supply 2, in this case a single-phase supply, whose voltage is adapted to the nominal charging voltage of the battery 1. For example, for a 12-volt battery 1, the AC voltage of the mains supply 2 is equal to 24 rms volts. The device according to one embodiment of the invention has a microprocessor 3, a memory 4, 5, 6 and 8 and a set of divider bridges. The memory may be subdivided into different parts, 4, 5, 6 and 8 of possibly different types. Alternatively, the parts 4, 5, 6 and 8 may correspond to different zones of a single physical memory. The divider bridges, whose details shall be given further below, provide access to a certain number of nodes, in this case A, B, C, D, E, F, showing inter alia the battery-charging conditions. The device of FIG. 1 also has a control logic circuit 7 and associated electronic circuits for the effective control of the charging of the battery.

One characteristic of the invention lies in the fact that the memory includes a memory 4 of membership functions. These functions are associated with the signals measured at the points A to D or at other points. In a membership function, for example in FIG. 2b, a measured variable, in this case VB, will be assigned a qualification, for example MEDIUM, depending on whether the value of the variable VB is within a corresponding range. The qualification MEDIUM is a qualification quantified by a coefficient of membership ranging from zero to one. This quantification is assigned depending on whether the value of the variable occurs entirely or does not occur at all within the qualified range. The membership functions are stored in the form of a table. The MEDIUM table of the membership function of the variable VB contains possible values of the variable VB as addresses. As data elements, recorded in these addresses in the table, this MEDIUM table has the values of corresponding membership functions. For the variable VB, FIG. 2b shows three membership functions entitled LOW, MEDIUM and HIGH.

Another characteristic of the invention is that the control device has another memory 5 (or another zone in a single memory) in which rules are recorded. These rules are used to set up correspondence between the quantified membership qualifications and command signals to be applied to control circuits. These rules are of the type "If—membership function—then—command signals". The memory 8 contains a fuzzy logic implementing program that successively organizes the preparation of the membership coefficients, the testing of the rules and the composing of the result of the rules to deduce the final result therefrom.

Elements 3–8 are connected to one another by an address and data bus 9. A bus 10 for the control of the microprocessor 3 connects the microprocessor 3 to the control logic circuit 7. When several battery chargers organized to charge a set of batteries are involved, the device of the invention may be provided with an interface 11 for connection with a master circuit 12. The interface 11 may be a carrier current type interface (whose signals are then conveyed by the main system 2) or a radiofrequency, coaxial, RS232 series or other type of interface.

To explain the architecture of the membership functions and the choice and composition of the rules, the circuit of FIG. 1 shall now be described in detail. Although points A B C D E F are chosen for the efficient management and administration of the charging in this embodiment for the measurement of the signals, it is possible to choose different nodes, or a greater or smaller number of them. Taking additional information provides for easier management. The complexity of the fuzzy logic management program will not be affected by the number of nodes chosen, even if the number is large. In practice, with about fifteen tables representing membership functions and about ten rules, it is possible to manage a complex operation at little cost. The addition of a set of three to five additional membership functions and some additional rules will not increase the complexity and will take up only very little additional space in the memory.

The battery charging control circuit 1 has a full-wave rectifier circuit 13 comprising, on a first conduction path, a thyristor 14 connected by its anode to a pole 15 of the supply and by the cathode to the node C corresponding to the positive pole of the battery 1. Alternatively, the thyristor 14 may be replaced by a power MOS circuit. The negative pole of the battery 1 is connected to the ground by a foot resistor 16. In one embodiment of the invention, the value of this foot resistor is very low: it is equal, for example, to 0.2 ohms so that, at the time of the nominal charging (of the order of 800 mA), it causes only a minimum voltage drop (of about 160 mVolts). This first conduction path is closed by a diode 17 whose anode is connected to the ground and whose cathode is connected to the second AC supply pole 18. A second path under the same conditions has a second thyristor 19 (or a power MOS transistor) and a second diode 20. The first path rectifies a so-called positive half-wave, and a second path rectifies a so-called negative half-wave. The thyristors 14 and 19 fulfil the same role as the diodes of a diode-based rectifier bridge. However, while being controlled by their respective triggers, they enable the efficiency of this trigger to be modulated through a phase modulation of conduction.

The control circuit has a PNP type transistor 21 whose emitter is connected by a diode 22 to the pole 15 and by a diode 23 to the pole 18. The diodes 22, 23 have their cathode connected to the emitter of the transistor 21. The collector of this transistor 21 is connected to the triggers of the thyristors 14 to 19 by coupling resistors, 24, 25 respectively (the value of which is equal to approximately 560 ohms in one illustrative embodiment of the invention). The collector of the transistor 21 is biased by a bias resistor 26 (in one embodiment of the invention the value of this resister is equal to approximately 10 kOhms). The base of the transistor 21, biased by a resistor 27 from the emitter, receives a command signal applied through a series resistor 28 (in one embodiment of the invention the resistors 27 and 28 are both equal to approximately 1 kOhm). It should be noted that the invention is not limited to the foregoing resistor values and that other values are possible.

Before the charging command signal is applied to the base of the transistor 21, the node C has a zero voltage (if the battery is completely discharged) or a low voltage (approximately 12 volts) with respect to the voltage peak (approximately 34 volts) available at the node 15 or the node 19. The transistor 21 is therefore supplied between these two nodes. When it receives a command pulse at its base, it becomes conductive, taking the collector to a voltage close to that of the emitter (close to 24 volts in one embodiment of the invention). This voltage is then applied by the resistors 24, 25 to the triggers of the thyristors 14 and 19 that become conductive. In fact, only the thyristor 14 or 19 which receives the positive half-wave at its anode becomes conductive. The other one remains off: it is in reverse. The command pulse may be long or short. Once the thyristors 14 or 19 are triggered, they continue to be conductive until the half-wave gets inverted. Should there be power MOS transistors, the command pulse is made to last up to this half-wave reversal.

To complete the circuit, the collector of the transistor 21 is connected to the resistors 24, 25, 26 by means of a diode 29.

Thus, with a full-wave rectified signal, it is possible to prompt a charging of the battery 1, the value of which varies according to the phase-locked instant at which the command is applied in relation to the passage of the half-wave through zero.

The divider bridges that enable the delivery of the signals to the nodes A to F are formed as follows. Between the node C and the ground, a series connection is set up between two resistors 30 and 31 (in one embodiment of the invention their values are respectively approximately equal to 10 kOhms and 16 kOhms). The midpoint A between these resistors 30 and 31 is connected as a measurement input of the microprocessor 3. In order to have available, at the node A, a signal value that does not undergo the successive influences of the rectified half-wave, a capacitor 32 (in one embodiment of the invention a 4.7 microfarad capacitor) is connected between the node A and the ground. The capacitor 32, with the resistors 30 and 31, forms a low-pass filter whose cut-off frequency, in one embodiment of the invention, is approximately 21 Hz. This frequency is lower, by a ratio of 5, than the frequency of the signal available at the node C when the mains 2 is a 50 Hz mains.

The signal at the node B is taken at the midpoint of a divider bridge having a resistor 33 (in one embodiment of the invention a 12 kOhms resistor) series-connected with a resistor 34 having a negative, or positive, temperature coefficient that is used to measure the temperature of the battery. To this end, it is seen to it that the resistor 34 is in direct contact with the battery, and possibly it may even be plunged into the liquid of this battery if the electrical connection wires are insulated. With the resistor 34 having a negative temperature coefficient, its value drops when the temperature of the battery rises: the potential at the node B between these two resistors 33 and 34 drops accordingly. The node B is furthermore connected to the ground by a capacitor 35 also making it possible to eliminate the high frequency components. While the potential of the node A reflects the presence of the battery, the potential at the node B reflects the fact that it is in good operating condition and the potential at the node C represents the current for charging the battery. The potential of the node D will represent the short-circuited state of the battery. Before it is connected to the microprocessor 3, the signal D also undergoes low-pass filtering through a resistor 36 and a capacitor 37 (in one example it is equal to 10 kOhms and 1 microfarad respectively).

To make this panoply of useful signals complete, a signal E is furthermore taken up from the supply, enabling the synchronization of the mains. The signal E is, in one embodiment of the invention, taken at the emitter of the transistor 21 by a divider bridge of resistors comprising the resistors 38 to 40 (having values in one embodiment of the invention of respectively of 100 kOhms, 10 kOhms and 22 kOhms) that are series-connected up to the ground. The midpoint of the resistors 38 and 39 is also connected to the ground by a capacitor 41 (equal to 1 microfarad in this embodiment of the invention) enabling the formation of a low-pass filter. This filter lets through the mains signal (its cut-off frequency is in the range of 800 Hz), but avoids the transmission, by way of synchronization, of the parasites coming from the microprocessor 3 which works at high frequency. The signal E detects the passage through zero between two half-waves. The midpoint of the resistors 39 and 40 is used as a point for the measurement of the mains synchronization.

Furthermore, a high temperature reference is produced by means of two resistors 42, 43 connected between a reference voltage output 44 of the microprocessor 3 and the ground. The midpoint F of the resistors 42, 43 is such that it delivers a voltage which will be compared to the voltage delivered by the node B.

The signals A to F are introduced to the inputs of a multiplexer 45 controlled by the logic circuit 7. The multiplexer 45 prompts the analog-digital conversion of these signals, one by one, in a converter 46 with a view to their processing by the microprocessor 3. The working speed of the analog-digital converter 46 is such that it can carry out a thousand measurements of the signals A to F per second, that is at least 10 measurements of each signal during each of the half-waves of the full-wave rectified mains signal.

The monitoring of the temperature of the battery may nevertheless be done by standard means comprising a digital comparator 47 receiving the signals F and B as well as, furthermore, control words. These are words MOT 1 and MOT 2 recorded in the memory 6 and representing minimum and maximum permitted temperatures for the battery 1. The comparator 47 compares the measured temperature with the borderline temperatures and uses the microprocessor 3 to prompt the stopping or continuing of the charging operation.

The microprocessor 3 finally uses its logic circuit 7 to activate the illumination of the differently colored light-emitting diodes 48, 49, for example colored green and red respectively and representing the charging of the battery or the stopping of the charging of the battery.

The microprocessor 3 performs all the fuzzy logic processing for the implementation of the command. However, when the command is decided upon, in one embodiment of the invention a modulation of the period of conduction of paths of the rectifier 13 is prompted as follows. A register is used, and the number of bits of this register, were they all taken to 1, would represent an accepted borderline value for the voltage of the battery. Furthermore, the effective voltage of the battery is measured. The effective value is then subtracted from this borderline value. A digital signal is obtained. This digital signal proportionally represents the portion of the period of time of a half-wave during which the battery has to be charged. In one example in which the storage register has 5 bits, 1 1 1 1 1 and in which the measured value is for example 1 0 0 0 1, the subtraction becomes 0 1 1 1 0, which amounts to reversing the measured value. In other words, the subtraction is easily accessible.

Alternatively, with a clock and a counter, steps can be taken for the counting, during each half-wave of the charging signal, of a number of clock strokes equal to the measured digital value of the voltage. As soon as this count is reached, the charging is activated. The lower this voltage, the lower its digital value will be, and the sooner the charging will begin in the half-wave. In practice, it is sufficient at each start of a half-wave (measured by the signal E) to preload the counter with the digital result obtained beforehand and stored in the register, and set up a reverse counting of time according to the clock strokes until the counter is at zero. When the counter is at zero, the charging of the circuit is activated. The circuit stops naturally at the reversal of the half-wave. Then the operation is recommenced for the next half-wave.

FIGS. 2a to 2d show membership functions that can be used in one embodiment of the invention.

Figure 2A:
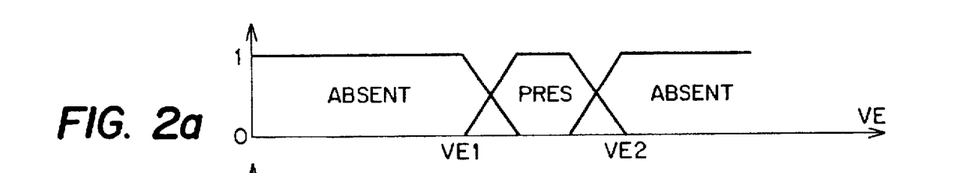
FIGS. 2a to 2d show a schematic view of functions, or qualifications, of membership of the variables measured in the control device according to one embodiment of the invention.
Figure 2B:
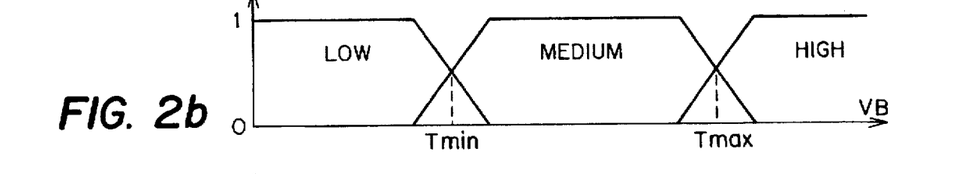

FIG. 2a shows the detection of the synchronization signal VE. This signal is said to be present when its value ranges from VE1 to VE2. Outside these values, it is said to be absent. The membership coefficient, given a value of 0 to 1, indicates the degree of certainty with which this signal is present or absent according to its value.

FIG. 2b shows the temperature signal of the battery. This signal may be LOW, MEDIUM or HIGH with membership coefficients ranging from 0 to 1 under the same conditions.

Figure 2C:
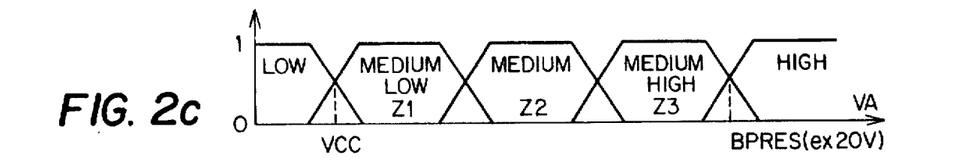

FIG. 2c shows the voltage available at the battery. This voltage may have three main membership functions, the LOW function, the MEDIUM function and the HIGH function. The LOW function means that, since the voltage at the terminals of the battery is low, this battery may be considered to be in short circuit. The LOW function exists if the voltage is below a short-circuit voltage VCC. However, if the battery is absent, the voltage at the point A will be high. This is the case if the voltage at the point A is higher than a voltage BPRES corresponding to the presence of the battery. This voltage corresponding to the presence of the battery is of the order of 20 volts in this embodiment of the invention.

Figure 3:
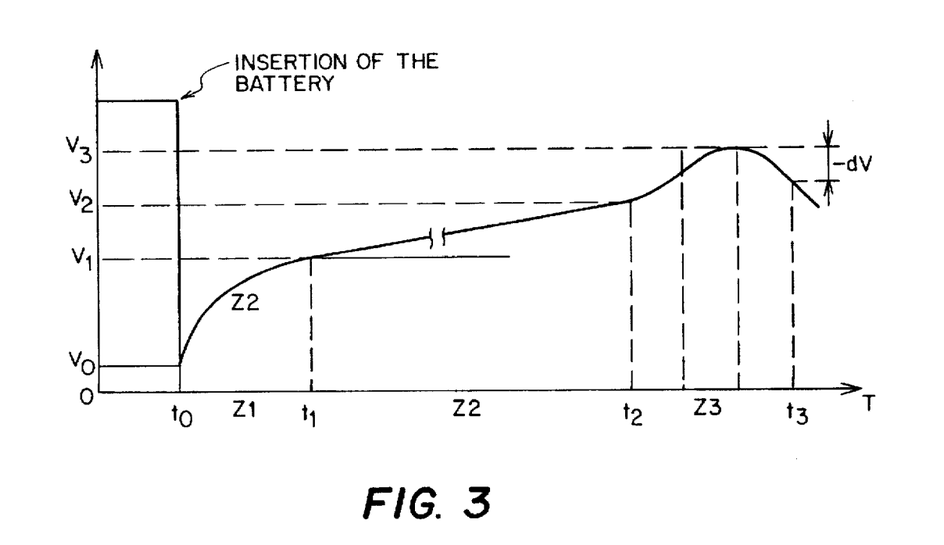
FIG. 3 shows a known type of representation of the progress in time of the voltage for the charging of a battery.

The MEDIUM membership functions will themselves be subdivided into three main functions: the LOWER MEDIUM function, the MEDIUM function and the HIGHER MEDIUM function. These membership functions correspond to zones for the charging of the battery which are also represented in FIG. 3 where the x-axis represents the time and the y-axis represents the voltage of the battery when it is being charged at constant current. During a first phase Z1, from the time t0 to time t1, after the insertion of the battery, the voltage of the battery increases at relatively high speed from V0 to V1. In the second phase, Z2, from t1 to t2, the voltage increases more slowly from V1 to V2. At the time t2, there is an acceleration of the increase of voltage during the period Z3 from t2 to about t3. During this period, the voltage increases from V2 to V3. The shape of this curve is known in the art. The three MEDIUM membership functions of FIG. 2c, pertaining to the charging zones Z1, Z2, Z3, are imbricated with one another. This means for example that the voltage V2 (measured for example at the time t2) may be considered to be a MEDIUM type voltage with a coefficient 0.5 and a HIGH MEDIUM type voltage also with a coefficient 0.5.

Figure 2D:
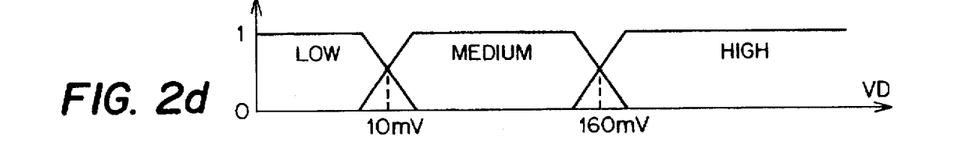

FIG. 2d, with three membership functions, shows a corroboration of the fact that the battery may be defective (in the sense of not being able to withstand the charging operation) or even short circuited. If the voltage at the point VD belongs to the LOW membership function (below 10 mVolts in one example), it will be deduced therefrom that the battery is defective. If VD is greater than 160 mVolts, it will be assumed that there is a short circuit.

The rules used in this embodiment of the invention are written here below:

If VB is LOW, then OUT is equal to 0 (no charging).

If VB is HIGH, then OUT is equal to 0.

If VB is MEDIUM, then OUT is equal to 1.

If VA is LOW and if VB is HIGH, then OUT is equal to 0.

If VA is HIGH, then OUT is equal to 0.

If VD is HIGH and if VA is MEDIUM, then OUT is equal to 0.

If VA is MEDIUM and if VD is MEDIUM, then OUT is equal to 1.

If VA is LOW and if VD is LOW, then OUT is equal to 0.

If VA (t1) is greater than VA (t0)+X and
if VA (t2) is greater than VA (t1)+X and
if VA (t3) is greater than VA (t2)+X, then there is a change of slope.

The first three rules relate to the measurement of temperature, the signal OUT corresponding to the command to be applied to the charging circuit. The next three rules relate to the fact that the battery can be short circuited.

While the first eight rules concern the signals that are available simultaneously (except for the operation of multiplexing by the multiplexer 45), the next three rules relate to the constitution of a chronology which ultimately, with the fuzzy logic, makes it possible to settle a problem of measurement of the derivative. In this case, the values at instants t0, t1, t2, t3 of the variables A are stored at successive addresses a0, a1, a2, a3 of a memory. Preferably this memory is a rotating one. Thus the addresses a0–a3 are modified step by step at each new measurement. A new measurement is stored at address a0. For that aim, the multiplexer 48 comprises a sequencer which performs these address rotations from one measurement of A to another. They are then each compared with a preceding value plus a predetermined quantity X. In one example, X equals 13 mVolts. If the measurement indicates that the growth of the voltage VA in time is greater than a threshold, namely the threshold X, between one measurement and a following measurement, then it will be decided that there is a change of zone. In this case, the measurement of the value VA itself will no longer be undertaken under the same conditions as above. This is valid essentially for the passage from the zone Z1 to the zone Z2.

Figure 4:
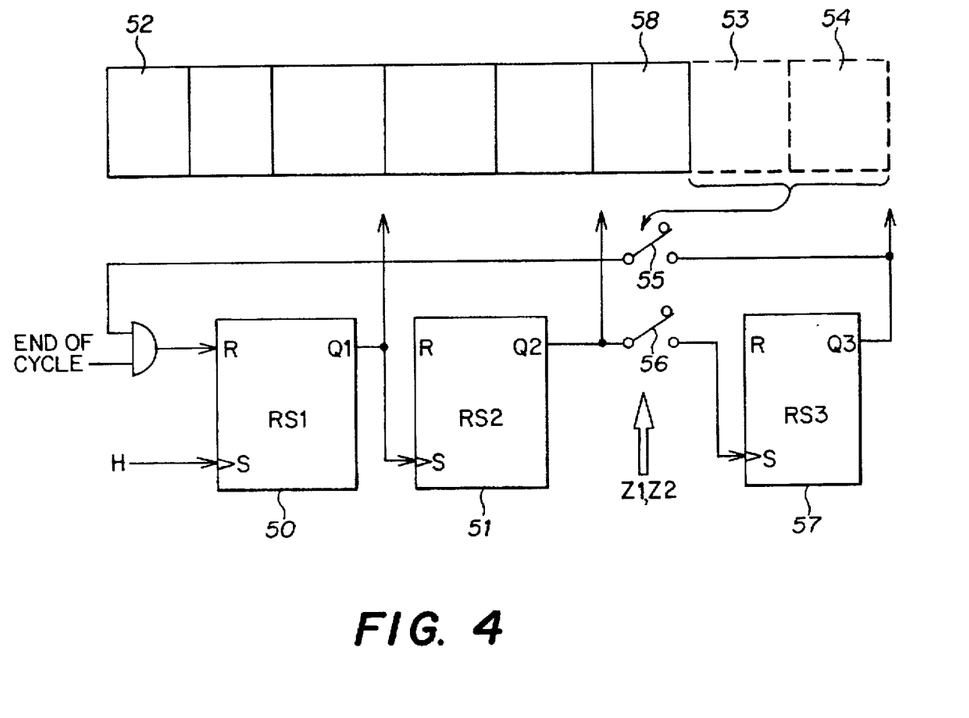
FIG. 4 shows an improvement of the device of the invention for taking an average of measured signals.

To this end, FIG. 4 shows an alternative embodiment of the device of the invention. To take account of the fluctuations of measurement, it is useful to take an average on several successive measurements. This could be done by the storage in registers, for example four registers for four successive measurements, of the measurement results and by taking the average of these measurements using an arithmetic operator contained in the microprocessor 3. However, this type of operation cannot easily be performed with a low-cost microprocessor 3. Indeed, this type of operation calls for the setting up of at least fifty logic gates which takes up space. The microprocessor 3 has to be larger and is therefore more expensive.

In another embodiment of the invention, to resolve this problem, it is observed that if it is desired to take an average of four measurements it is enough to set up the cascade connection of two RS type flip-flop circuits 50 and 51. Ultimately, a modulo four counter called a counter by four is made in this way. If these four successive measurements have, on an average, the same value as four preceding measurements, the counter by four will be in the same state at the end as the state in which it was at the outset. However, if during the measurement, the mean value increases, the result of the counter by four at the end will be different.

The counting is undertaken simply by observing that the analog-digital converter 46 has a sampler that is cascade-connected with a counter circuit. This counter circuit counts charging pulses necessary to equalize the voltages on two connections that receive firstly the sampled signal and secondly the counted charging pulses. When there is equality, the counting of the pulses is stopped. The state of the pulse counter therefore represents the digital quantification of the sampled analog signal. Normally, this signal is stored in a register 52.

In this embodiment of the invention, these counted pulses are used to increment the counter by four that is constituted by the flip-flop circuits 50 and 51. The counting clock signal is applied to the S input of these flip-flop circuits. These flip-flop circuits are cascade-connected, the output Q1 of the flip-flop circuit 50 being connected to the S input of the flip-flop circuit 51. The final state of this counter by four provides information on the least significant bits of the counting.

Ultimately, rather than having four registers plus one register for the storage of the result, there is only one register 52 that receives the signal delivered by the converter 46 in the register 52, the two least significant bits 53 and 54 being in fact replaced by the signals available at output of the flip-flop circuits 51 and 50 respectively.

When changing from zone Z1 to Z2, rather than taking an average by four, an average by eight will be taken. To this end, with the signal for the detection of he changing of zones Z1, Z2, two switches 55, 56 are closed. These are switches that set up the cascade connection of a third flip-flop circuit 57 with the flip-flop circuits 50 and 51. Here another least significant bit 58 will be replaced in the register 52 by the contents of the flip flop 57. The changing of zones is detected by the use of a rule which indicates that if the signal VA is LOW MEDIUM with a coefficient different from zero and if it is also MEDIUM under the same conditions, then it is necessary to effect a change of zone and activate the switch-over. Taking the average of eight is used to detect the future passage from Z2 to Z3 by measuring a variable that can be likened to a second derivative. Indeed, the counter by eight (modulo eight) makes it possible, by totaling the variations, to determine the point in time at which the voltage V2 is reached. Since the counter by eight switches over later than the counter by four it measures the change in slope.

The program memory 8 is a memory that enables the composing of the rules mentioned here above. It will be noted that, for the computation of the commands, especially the charging command signals, it is possible to choose a known type of composition called a composition by product or a so-called minimum composition. A composition by product implies the multiplication of the commands weighted by the membership coefficients, the charging being permitted only when the command is equal to more than zero. The composition by the minimum ultimately implies taking account of the lowest membership coefficients and obtaining a command that is weighted or non-weighted depending on the results. Should a weighted charging operation be prompted by the value of the command, the weighting will be a weighting of period or duration. A charging command with a value of 0.5 leads, for example, to a charging period that is half the normally chosen period.

As referred to earlier regarding the phase control for the activation of the thyristors, the half charging operations entail the addition of a most significant bit 1 to the measurement of VA. In this case, at each half-wave, that is a delay of a double period of time before the charging is activated. Therefore, the charging period is reduced.

Figure 5:
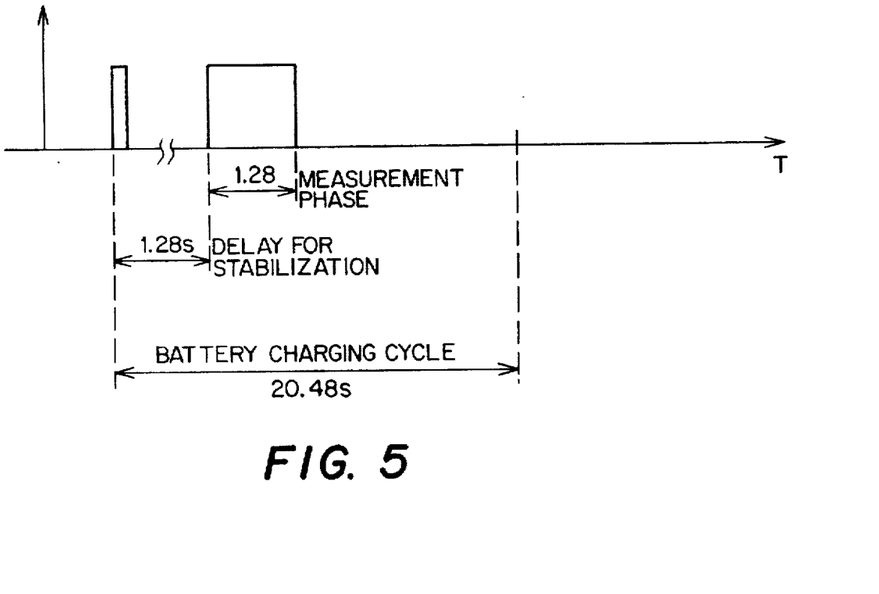
FIG. 5 shows a preferred mode of charging of the batteries with the device of the invention.

FIG. 5 gives a view, to comply with a mode of standardization that is being undertaken at the present time, of the distribution of the battery-charging operation into cycles. A cycle whose standardized period of time is 20.48 seconds has three phases. There is a first phase of 1.28 seconds enabling a stabilization of voltage in the battery and in the charging and measuring circuit. There is a second phase, with a period of time also equal to 1.28 seconds, that is a measurement phase. This is the period during which the voltages at the points A B C D E and F are measured. The third phase is a charging period. This is the period that remains within the cycle after the two phases have elapsed. During the charging period, the period of conduction is modulated at each half-wave as a function of the charging requirement.

The fact that a battery is not withstanding to the charging process is noted at the administrative and technical levels: this is done through a measurement, made simply by a comparison, over several cycles, of the effective periods during which the charging has been authorized (these periods corresponding to the accumulation of the periods during which, in the course of each half-cycle, the thyristors are on). The periods are compared with the voltage VA or another voltage. If this comparison is unfavorable, it is deduced therefrom that the battery is not withstanding the charging and it is then possible to abandon attempting to charge it. The comparison is unfavorable if VA no longer increases while the charging periods are significant. To this end, values of certain charging conditions will be stored, in the memories and especially in the memory 6, from one cycle to another in order to compare them with one another and deduce the requisite decisions therefrom.

Finally, by totaling these charging periods, it is possible to assess the total charging time and consequently the cost of each recharging operation.

The interface 11 has an exchange memory. This exchange memory is used to ensure communication between the master circuit and the slave. It enables the remote loading of the values of slopes that differ according to the type of battery. At the same time, it provides the possibility of charging these values dynamically (during a use) by remote loading into the registers of the memory 6. It thus enables the remote loading of the local rules that enable the modification of the behavior of the system in response to a specific problem of operation or in a specific zone.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A device for controlling the charging of at least one battery, the device comprising:

a microprocessor;

a memory coupled to the microprocessor;

a set of voltage divider bridges for measuring the charging conditions of the at least one battery; and a circuit for controlling the charging of the at least one battery, wherein the memory includes stored therein:

a set of membership functions associated with signals measured on the set of voltage divider bridges, the set of membership functions forming correspondence values quantified by coefficients of values of these signals, wherein each membership function has a qualification that designates the membership function;

a set of rules setting up correspondence values between the qualifications of the membership functions and further setting up command signals to be applied to the circuit for controlling the charging of the at least one battery;

a program that organizes results of the rules to produce the command signals;

a rotating memory to store several successive states of one of the charging conditions of the at least one battery;

wherein the set of rules includes at least one rule that takes account of the successive states to set up a correspondence with signals to be applied to one of the circuit for controlling the charging of the at least one battery and the set of voltage divider bridges for measuring the charging conditions of the at least one battery.

2. The device according to claim 1, further comprising:
a counter circuit having n cascade-connected flip-flop circuits to receive 2 n successive measurement signals from the set of voltage divider circuits and take the average thereof.

3. The device according to claim 2, further comprising:
a circuit for changing the number of flip-flop circuits of the counter that are cascade-connected.

4. The device according to claim 1, further comprising:
a converter for converting an analog signal into a converted digital signal;
a circuit for determining, from the converted digital signal, a digital signal corresponding to a period proportional to the time the at least one battery is to be charged; and
a clock and a counter to prompt the charging of the at least one battery during a certain period of time referenced, as a function of the converted digital signal, with respect to a synchronization signal.

5. The device according to claim 1, further comprising:
a circuit for detecting the passage through zero of a voltage supply signal for charging the at least one battery.

6. The device according to claim 1, further comprising:
a circuit for measuring the temperature of the battery, the circuit including a resistor having one of a negative and positive temperature coefficient.

7. The device according to claim 1, wherein the set of voltage dividers includes a divider bridge connected to the terminals of the circuit for controlling the charging of the at least one battery, wherein the divider bridge measures a voltage signal corresponding to the voltage of the at least one battery.

8. The device according to claim 7, further comprising:
a foot resistor coupled to the at least one battery, for measuring a voltage signal which, along with the voltage signal corresponding to the voltage of the at least one battery, represents one of the presence and absence of the efficient working condition of the at least one battery.

9. The device according to claim 1, wherein the program manages the charging of the battery with charging cycles, each cycle comprising a stabilization phase, a measurement phase and a charging phase; and
the memory includes area for the storage, from one cycle to another, of the values of certain charging conditions of the at least one battery, so that the values of certain charging conditions can be compared to one another.

10. The device according to claim 1, further comprising:
an interface circuit that operates by carrier current; and
a master circuit coupled to the interface circuit.

11. The device according to claim 1 in combination with a plurality of like devices for controlling the charging of at least one battery.

12. The combination according to claim 11, further comprising:
a master logic circuit, wherein each device further comprises:
an interface for communication with the master logic circuit; and
circuitry for modifying one of the set of membership functions and the set of rules as a function of signals received from the master logic circuit.

13. A device for controlling the charging of at least one battery, the device comprising:
a microprocessor;
a memory coupled to the microprocessor;
a set of voltage divider bridges for measuring the charging conditions of the at least one battery; and
a circuit for controlling the charging of the at least one battery, wherein the memory includes stored therein:
a set of membership functions associated with signals measured on the set of voltage divider bridges, the set of membership functions forming correspondence values quantified by coefficients of values of these signals, wherein each membership function has a qualification that designates the membership function;
a set of rules setting up correspondence values between the qualifications of the membership functions and further setting up command signals to be applied to the circuit for controlling the charging of the at least one battery; and
a program that organizes results of the rules to produce the command signals.
a counter circuit having n cascade-connected flip-flop circuits to receive 2 n successive measurement signals from the set of voltage divider circuits and take the average thereof.

14. A method of charging a battery, comprising the steps of:
measuring a plurality of signals that respectively relate to a plurality of charging conditions of the battery;
establishing a set of membership functions that assign a qualification to each measured signal, the qualification being quantified by coefficient determined by the membership function;
establishing a set of rules that generate commands based on the quantified qualification assigned by the set of membership functions; and
organizing the rules to generate a battery charging command.

15. The method according to claim 14, further comprising the step of storing successive states of one of said plurality of charging conditions.

16. The method according to claim 15, wherein one of said rules generates a command based on the successive states.

17. The method according to claim 16, further comprising the step of averaging the successive states.

18. The method according to claim 17, further comprising the step of managing the charging of the battery, the battery having a plurality of charging cycles, each cycle including a stabilization phase, a measurement phase and a charging phase.

19. The method according to claim 18, further comprising the step of storing charging conditions from the plurality of charging cycles.

20. The method according to claim 14, further comprising the step of managing the charging of the battery, the battery having a plurality of charging cycles, each cycle including a stabilization phase, a measurement phase and a charging phase.

21. The method according to claim 20, further comprising the step of storing charging conditions from the plurality of charging cycles.

22. A system for charging at least one battery, the system comprising:
a supply coupled to the at least one battery for charging the battery;
a circuit for coupling the supply to the at least one battery;

means for measuring a plurality of signals that respectively relate to a plurality of charging conditions of the at least one battery;

a microprocessor coupled to the circuit for controlling the circuit to couple the supply to the at least one battery; and a memory comprising:
- a set of membership functions that assign a qualification to each measured signal, the qualification being quantified by coefficient determined by the membership function;
- establishing a set of rules that generate commands based on the quantified qualification assigned by the set of membership functions; and
- organizing the rules to generate a battery charging command.

23. The system according to claim 22, wherein said means for measuring includes a plurality of voltage dividers.

24. The system according to claim 22, wherein the means for measuring includes a resistor having one of a positive and negative temperature coefficient for measuring the temperature of the at least one battery.

25. The system according to claim 24, wherein the means for measuring includes a voltage divider for measuring a voltage corresponding to a voltage of the battery.

26. The system according to claim 25, further comprising a multiplexor coupled to the means for measuring that receives the plurality of signals.

27. The system according to claim 26, further comprising a comparator for receiving a signal corresponding to the temperature measured by the resistor, and compares the signal corresponding to the temperature to a reference.

28. The system according to claim 27, further comprising a counter for counting to a digital value corresponding to the voltage of the at least one battery measured by the voltage divider, wherein when the digital value is reached by the counter, the microprocessor controls the circuit to couple the supply to the at least one battery.

29. The system according to claim 22, wherein the means for measuring includes a voltage divider for measuring a voltage corresponding to a voltage of the battery.

30. The system according to claim 22, wherein the means for measuring includes a voltage divider for measuring a voltage corresponding to a voltage of the battery.

31. The system according to claim 30, further comprising a counter for counting to a digital value corresponding to the voltage of the at least one battery measured by the voltage divider, wherein when the digital value is reached by the counter, the microprocessor controls the circuit to couple the supply to the at least one battery.

32. The system according to claim 22, wherein the at least one battery includes a plurality of batteries and the system further comprises:
- a master logic circuit,
- a plurality interfaces respectively associated with the plurality of batteries, each interface for communication with the master logic circuit.

33. The system according to claim 32, further comprising circuitry for modifying one of the set of membership functions and the set of rules as a function of signals received from the master logic circuit.

* * * * *